(12) United States Patent
Gruber

(10) Patent No.: US 9,077,170 B2
(45) Date of Patent: Jul. 7, 2015

(54) ELECTRONIC PROTECTION DEVICE, METHOD FOR OPERATING AN ELECTRONIC PROTECTION DEVICE, AND USE THEREOF

(71) Applicant: dSPACE digital signal processing and control engineering GmbH, Paderborn (DE)

(72) Inventor: Paul Gruber, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 15 days.

(21) Appl. No.: 13/974,517

(22) Filed: Aug. 23, 2013

(65) Prior Publication Data
US 2014/0055899 A1 Feb. 27, 2014

(30) Foreign Application Priority Data

Aug. 23, 2012 (DE) .......................... 10 2012 107 779

(51) Int. Cl.
*H02H 1/00* (2006.01)
*H02H 3/08* (2006.01)
*H02H 9/02* (2006.01)

(52) U.S. Cl.
CPC ............... *H02H 1/0007* (2013.01); *H02H 3/08* (2013.01); *H02H 9/025* (2013.01)

(58) Field of Classification Search
CPC ........ H02H 3/08; H02H 9/025; H02H 1/0007
USPC ................................................ 361/91.6, 106
See application file for complete search history.

(56) References Cited

U.S. PATENT DOCUMENTS 438,305 A 10/1890 Edison
4,752,852 A 6/1988 Ahl et al.
(Continued)

FOREIGN PATENT DOCUMENTS

DE 10 2008 060 722 A1 6/2010
DE 10 2006 008 292 B4 9/2011
(Continued)

OTHER PUBLICATIONS

"BOURNS Multifuse, Resettable Fuses—Polymer PTC & Ceramic PTC", 2008.
(Continued)

*Primary Examiner* — Scott Bauer
(74) *Attorney, Agent, or Firm* — Muncy, Geissler, Olds & Lowe, P.C.

(57) ABSTRACT

An electronic protection device for protecting at least one electrical load, connectable to the protection device, whereby the electronic protection device has an input terminal and an output terminal, and whereby the protection device includes a fuse element, which is thermally self-resetting, and whereby the fuse element is provided and set up to conduct or limit a first current as a function of a fuse element temperature, whereby a limiting component is provided to limit the first current, and whereby the limiting component has a first transistor that is connected in series to the fuse element and a monitoring circuit that influences the first transistor. The monitoring circuit blocks the first transistor when the first current reaches or exceeds a predefined maximum current value and unblocks it when the first current reaches or falls below a predefined reset current value.

17 Claims, 5 Drawing Sheets

(56) References Cited

U.S. PATENT DOCUMENTS

| | | | | |
|---|---|---|---|---|
| 5,689,395 | A | * | 11/1997 | Duffy et al. ............... 361/93.6 |
| 5,763,929 | A | * | 6/1998 | Iwata ........................ 257/467 |
| 6,072,681 | A | * | 6/2000 | Cogan et al. ............... 361/106 |
| 6,078,160 | A | * | 6/2000 | Cilluffo ...................... 318/641 |
| 6,100,745 | A | * | 8/2000 | Dougherty .................. 327/512 |
| 6,278,596 | B1 | * | 8/2001 | Simpson ...................... 361/42 |
| 6,421,216 | B1 | * | 7/2002 | Myong et al. ............... 361/103 |
| 8,031,455 | B2 | * | 10/2011 | Paik et al. ................... 361/104 |
| 8,174,811 | B2 | * | 5/2012 | Hasunuma et al. .......... 361/106 |

FOREIGN PATENT DOCUMENTS

| | | |
|---|---|---|
| WO | WO 86/06223 A1 | 10/1986 |
| WO | WO 94/11937 A1 | 5/1994 |

OTHER PUBLICATIONS

DE Search Report dated Jun. 3, 2013 with computer generated English language translation.

* cited by examiner

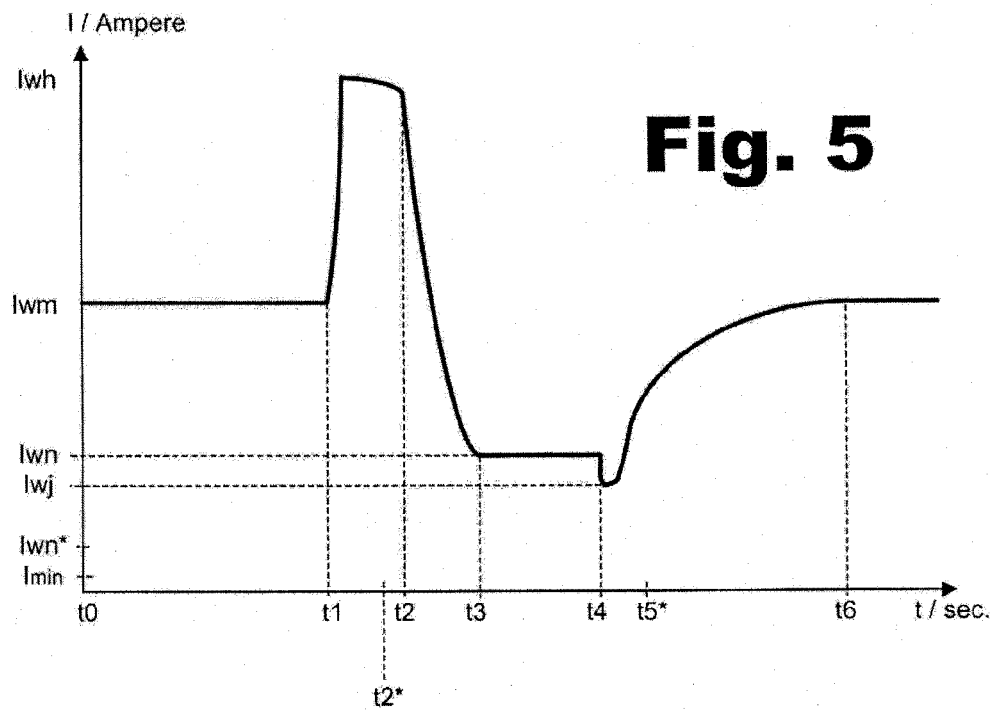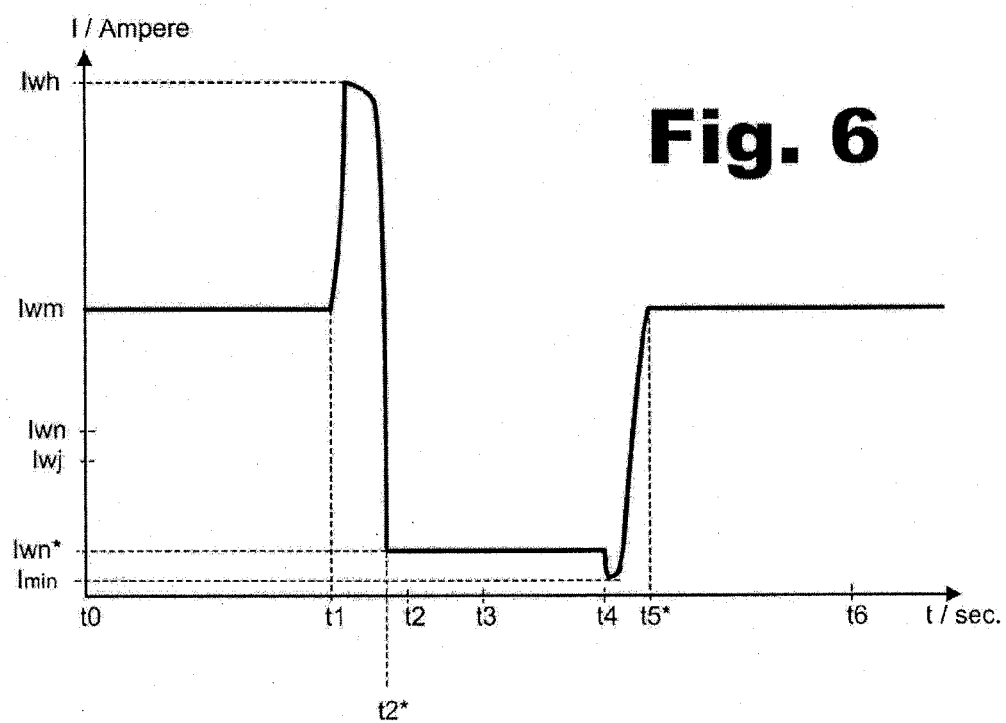

ELECTRONIC PROTECTION DEVICE, METHOD FOR OPERATING AN ELECTRONIC PROTECTION DEVICE, AND USE THEREOF

This nonprovisional application claims priority under 35 U.S.C. §119(a) to German Patent Application No. DE 10 2012 107 779.7, which was filed in Germany on Aug. 23, 2012, and which is herein incorporated by reference.

BACKGROUND OF THE INVENTION

1. Field of the Invention

The present invention relates to an electronic protection device for protecting at least one electrical component connectable to the protection device. The invention relates further to a method for operating an electronic protection device and the use of an electronic protection.

2. Description of the Background Art

A number of protection devices whose purpose is to protect a voltage source and/or a load, connected to the voltage source, particularly from excessive currents are known from the state of the art.

Such protection devices were developed and employed even at the beginning of the industrial use of electrical energy, as, for example, U.S. Pat. No. 438,305 of T. A. Edison for a "fuse block" shows, which dates from a patent application from the year 1885. Such a fuse block, like the majority of safety fuses used today, has the disadvantage that after a fault event, therefore after the melting of the so-called fuse element, the existing safety fuse must be replaced by a new safety fuse.

To avoid having to replace a blown fuse after a fault event, for example, "self-resetting fuse elements," which are also called "self-resetting thermal fuses," were developed in the past. A number of versions of self-resetting fuse elements are commonly used. Among experts, self-resetting fuse elements are generally differentiated by the material used for their manufacture. Especially common self-resetting fuses are so-called "PTC fuses," particularly PTC fuses with a polymer base, whereby these last-named fuses are often called a "PPTC fuse" (polymeric positive temperature coefficient fuse). Examples of self-resetting thermal fuse elements are described in the short form catalog "BOURNS® Multifuse®, Resettable Fuses—Polymer PTC & Ceramic PTC" from the year 2008.

In a further section of the description, reference will again be made to this short form catalog, designated as document "PD1" below.

In the following text, the term "self-resetting thermal fuse element" will be called a "fuse element" in short.

A disadvantage of a fuse element of the indicated type is that during its use a possible overloading of an electrical circuit can in fact be prevented for a calculable time period, but during relatively frequent or continuous operation of a fuse element in the "tripped state", therefore in the substantially current-blocking state, due to a "continuous load" on the fuse element irreversible changes occur in the fuse element, which considerably shorten its lifetime. In other words, for example, the described continuous load on the fuse element leads to its premature aging, which depending on the occurrence of other boundary conditions can lead to the destruction of the fuse element, for example, under unfavorable boundary conditions even after a few days.

As a rule, the lifetime of a fuse element is the shorter, the longer (with regard to time) the fuse element is exposed to the aforementioned continuous load and the higher the temperature of the fuse element during the continuous load.

In cases in which, for example, a wiring error remains undetected for a longer period of time, for example, for a time interval of a number of days, weeks, or months, this can have serious consequences, for example, when the component connected to the fuse element is connected to a voltage source or a reference potential in such a way that the fuse element in the aforementioned time interval (days, weeks, or months) is kept substantially continuously in the "tripped," therefore blocking state. The destruction of the fuse element, possibly occurring after this type of continuous load, can subsequently bring about a considerably increased current through the fuse element, which can lead to the destruction of a connected electrical component, originally protected by the fuse element, or other components.

Other resultant problems of a destroyed fuse element, which no longer performs the intended function, under certain boundary conditions can even be that the fuse element burns away, which ultimately can lead to the destruction of entire component groups of an electrotechnical device and other adjacent items, which are in physical proximity to the burning fuse element.

Furthermore, an often insufficiently high or an insufficiently low tripping delay is disadvantageous in the case of protection devices, which only use a fuse element for protection from an overcurrent. In fact, the user or developer of a protection device, which only has a fuse element, can influence the tripping delay of the protection device to a limited extent, in that the employed fuse element is selected from the standpoint of circuit tripping delay, but ultimately there continues to be an enormous dependence on the design specifications of the fuse element manufacturer. The protection device parameters present after the fuse element manufacturing process are determined by these design specifications.

In other words, the user or developer does not have a simple, practically usable method to change the time switching behavior selectively and predictably. In cases in which the protection devices consist only of fuse elements, in regard to the tripping delay of the protection device, developers or users are therefore committed to the respective parameters of the fuse element manufacturer.

A further disadvantage of a protection device according to the state of the art, which consists, for example, solely of a fuse element, is the relatively great ability of the ambient temperature of the protection device to influence the parameters and hence the fault current response of the fuse element (called, for example, the "PTC response characteristic").

Another example of prior-art protection devices is an electronic fuse. The publication of the international patent application WO 86/06223 A1, which corresponds to U.S. Pat. No. 4,752,852, can be cited for this purpose. According to this publication, a switch could be controlled by electrical pulses. As soon as the current exceeds a predetermined value, the electronic fuse could restrict the current flow by means of the switch. The time period during which the switch is closed by means of the pulse could shorten if the current increases due to a load. The switch could be opened completely when a predetermined maximum allowable current value is exceeded.

SUMMARY OF THE INVENTION

It is therefore an object of the present invention to provide a device that refines the state of the art. Furthermore, an object of the invention is to provide a use of the device and a method for operating an electronic protection device, which are refinements of the state of the art.

According to the subject matter of the invention, an electronic protection device is designed for protecting at least one electrical component, connectable to the protection device, whereby the electronic protection device has an input terminal and an output terminal, and whereby the protection device comprises a fuse element, which is thermally self-resetting, and whereby the fuse element is provided and set up to conduct or limit a first current as a function of a fuse element temperature, characterized in that a limiting component is provided to limit the first current, whereby the limiting component has: a first transistor, which is connected in series to the fuse element, and a monitoring circuit that influences the first transistor, whereby the monitoring circuit is provided and set up to block the first transistor, when the first current reaches or exceeds a predefined maximum current value, and to unblock it, when the first current reaches or falls below a predefined reset current value.

An advantage of the invention is that the electronic protection device of the invention, if the protection function is used, has a longer lifetime or delayed aging in comparison with a protection device that has only a fuse element. Particularly if the two aforementioned protection devices being compared prevent an excessive increase of the first current by means of the respective associated protection method over a period of days, weeks, or months, the lifetime of the protection device of the invention is extended the more considerably compared with a "mere" fuse element approach, the more often the protection method is tripped, therefore the more frequently an overcurrent needs to be interrupted by the protection device.

Another advantage of the invention is, particularly, a higher reliability of the protection device and/or improved protection from the consequential damages of an overload of the protection device, for example, improved protection from a fire hazard, which can result from a worn out or defective protection device.

The advantage of the increased reliability of the protection device of the invention in comparison with long-known protection devices also comes into play particularly when another external voltage source (not shown in the figures) is wrongly connected at the output of the protection device; this can lead to a "feedback" of a current via the fuse element and via the body diode of the first transistor and to failure of the limiting component. This type of wrong connection of the output, which according to experience is to be expected less often, but nonetheless leads to blocking of the inventive fuse element. Briefly stated, the invention increases the reliability of a circuit as a result of the invention, in applications frequently experienced in the interplay of the limiting component and the fuse element, and in applications are experienced less often by means of the functioning of the fuse element without involvement of the limiting component.

Exemplary embodiments of the protection device of the invention will be described below by the figures. It should be noted that the figures and the sections in the description associated with the figures are special cases for a broader teaching of the invention.

The term, current source CS, used in an embodiment is not meant to be an "ideal current source" according to the electrotechnical circuit theory, but a current source that has a finite internal resistance (not shown in the figures) and a finite voltage range that can be represented by the current source.

The employed term, voltage source VS, does not stand in an embodiment for an ideal voltage source, but for a voltage source that comprises an internal resistor (not shown graphically) with an internal resistance greater than zero ohm.

The load LS is a circuit or a circuit, in an embodiment, preferably connected to the output of the electronic protection device of the invention, or an electrical component through which the load current $I_3$ flows, when the electronic protection circuit is connected to its input terminal IN with the voltage source VS. The load LS can be formed, for example, from a single ohmic resistor or in an exemplary fault case from a short-circuit line to a reference potential or have, for example, a complex circuit arrangement, comprising ohmic resistors, capacitors, and inductive resistors, or comprise in principle any electrical energy consumer with a complex structure, especially a digital circuit arrangement. The embodiments according to FIGS. 2 and 3 show a load LS, which is symbolized by a single ohmic resistor, which is connected, on the one hand, at its first terminal to output terminal OUT and, on the other, at its second terminal to a reference potential GND.

Insofar as quantitative data are provided for currents within the scope of the present teaching, for example, in value comparisons, the quantitative data usually refer to the value of the current. In other words, in the present text the current directions, inasmuch as these are not expressly dealt with, are not considered. Inasmuch as reference is made to the embodiments of the invention according to FIGS. 1 to 3, it should be noted that the synergy effect of the interaction of limiting component with the fuse element PF is provided only in the cases in which the first current flows through the fuse element PF according to the technical current direction to the output OUT of electronic protection device ES. In other words, the above-described synergy effect in the embodiments according to FIGS. 1 to 3 occurs when the output OUT of the electronic protection circuit ES with consideration of the sign of the electrical potential has a smaller potential than the input IN of the electronic protection circuit ES.

Quantitative data for voltages, for example, in value comparisons, are to be read in the text below in regard to a reference potential GND, provided not expressly explained in a different way.

Especially preferably, the reference potential GND has a voltage of zero volts. It can basically be provided, however, that the reference potentials differ from one another, for example, at a reference potential connecting point of a voltage source VS and/or at a reference potential connecting point of load LS and/or at the reference potential connecting point of a current source CS.

As soon as the first current has reached or exceeded a predefined maximum allowable value (designated below using the reference character $I_{wh}$), the term "overcurrent" is used within the scope of the present teaching in regard to the first current. According to the definition given above, depending on the time course and the value of the overcurrent and depending on the design of the circuit detail of the electronic protection circuit ES, i.e., particularly depending on the selection of the individual electronic components of the protection circuit ES, the overcurrent leads to two different triggerable sequences of action by the electronic protection device, whereby, however, both action chains lead to the same end result, namely, interruption of the overcurrent. This will be discussed in greater detail in one of the following sections of this description in connection with explanations for FIG. 2.

Within the scope of the present teaching, the term "overload" indicates a load LS which is connected to the output of the electronic protection device and triggers the method of the invention. In other words, the overload leads to an overcurrent, which after the elapse of a delay time is interrupted by the electronic protection device. The overload can be configured, for example, as an ohmic resistor, taking the third current from the output to the reference potential, or a short circuit.

A "tripped state" of electronic protection device ES of the invention is understood to be the state of protection device ES in which the second current $I_2$ through first transistor T1 is substantially interrupted. The leakage current, which cannot be avoided even in a blocked first transistor T1 in prevailing practice, can be neglected in regard to the present teaching and is not considered in the further text.

Designated as the "reset current value" Imin is the value of the first current $I_1$ at which the "tripped state" of the electronic protection device changes to a non-tripped state. In other words, after the occurrence of an overload and the subsequent blocking of the first transistor T1, subsequently at a first current $I_1$ with $$I_1 = Imin$$

or $$I_1 < Imin$$

the first transistor T1 is again set to the conducting state by means of the monitoring circuit WA.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5 shows a schematic view of an exemplary current-time curve of a protection circuit from the state of the art, in which protection from overload of a connected electrical energy source is provided only by a fuse element PF. Such a long-known circuit is shown, for example, in the illustration on page 3, right column, of the aforementioned document PD1.

FIG. 6 shows a schematic view of an exemplary current-time curve of a protection circuit according to the invention. For a better understanding of the advantages of the invention, some of the qualitative and/or quantitative differences between the current-time curve of FIG. 6 and the current-time curve of FIG. 5 are indicated on the abscissas and on the ordinates.

DETAILED DESCRIPTION

Figure 1:
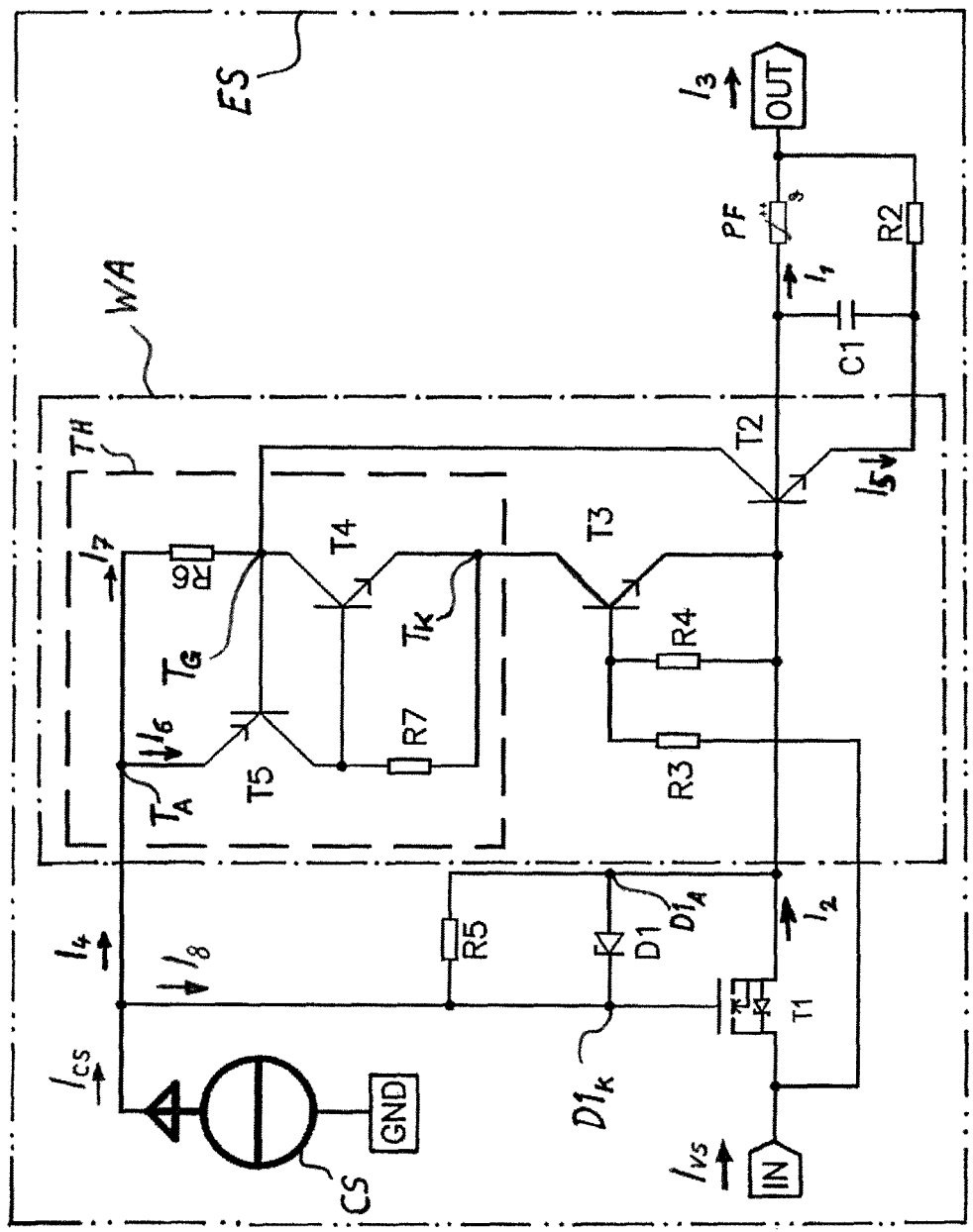
FIG. 1 shows a circuit diagram of an embodiment of an electronic protection device ES of the invention.

Exemplary embodiments of the electronic protection device according to the invention will be explained in greater detail in the following text with use of FIGS. 1 to 3. In addition, other advantages of the invention or advantages of the embodiments of the invention will be presented below with reference to the drawings. In this respect, similar parts are labeled with identical designations. The characteristic curves of FIG. 4, FIG. 5, and FIG. 6 are highly schematized; i.e., FIGS. 4, 5, and 6 are not measured characteristic curves but simplified characteristic curves, which make clear the mode of action and some of the advantages of the invention or the embodiments of the invention.

In the text below, the reference character "PF" is used for the fuse element, which is thermally resetting.

With the following examples and with the use of FIG. 2, FIG. 3, and FIG. 4, the two aforementioned action sequences, which were already mentioned in this description in the definition of the term "overcurrent," will be described in greater detail.

The first action sequence is characterized in that fuse element PF is first heated by the overcurrent, caused by an overload, and after heating set to the blocking state (see the associated characteristic curve range between P2 and P4 in FIG. 4), whereby in the following steps, blocking of first transistor T1 by monitoring circuit WA occurs in the end, and then further a reduction of the temperature of fuse element PF. The reduction of the temperature TPF of fuse element PF, due to the interruption of second current $I_2$ by means of first transistor T1, influenced by monitoring circuit WA, and the associated massive reduction of first current $I_1$, after a delay period in fact leads to a resetting of fuse element PF to the conducting state (see associated characteristic curve range between P1 and P2 in FIG. 4); however, in the embodiments according to FIGS. 1, 2, and 3, it is not provided that first current $I_1$ in the case of an overload connected unchanged at output OUT again increases at output OUT in such a way that fuse element PF again enters the blocking state, which is unnecessary in any case in this situation, because blocked transistor T1 holds the protection function as long as the overload at output OUT is not eliminated. Consequently, no continuous thermal load of fuse element PF results due to the connected overload. In other words, fuse element PF is again brought back into the low-resistance characteristic curve range, which is shown in FIG. 4 between the characteristic curve points P1 and P2, by means of monitoring device WA and by means of transistor T1, which in the case of an overload interrupts second current $I_2$.

After transistor T1 was set to a blocked state due to the overload, first transistor T1 remains in the blocked state until the overload is either separated from output OUT or the overload in some other way loses the effect as an overload, for example, by a change in resistance within load LS. The disappearance of the overload, or alternatively the decline of first current $I_1$ to or below the reset current value Imin, results in that the electronic protection circuit again enters its original state, in which first transistor T1 and fuse element PF are "low-resistance."

The second action sequence is characterized in that fuse element PF is first heated for only a relatively short time by the overcurrent, caused by an overload, and in this regard is not set to the blocking state, which corresponds to the characteristic curve range between the characteristic curve points P1 and P2 in FIG. 4, whereby in the following steps, blocking of first transistor T1 by monitoring circuit WA occurs, and then also a reduction of the temperature of fuse element PF. The reduction of the temperature TPF of fuse element PF, due to the interruption of second current $I_2$ by means of first transistor T1, influenced by monitoring circuit WA, and the associated massive reduction of first current $I_1$, after a delay period in fact leads to a resetting of fuse element PF to a low-resistance state, which is shown in the associated characteristic curve range between P1 and P2 in FIG. 4. Naturally, the low-resistance state of fuse element PF also occurs after elimination of the overload.

Figure 2:
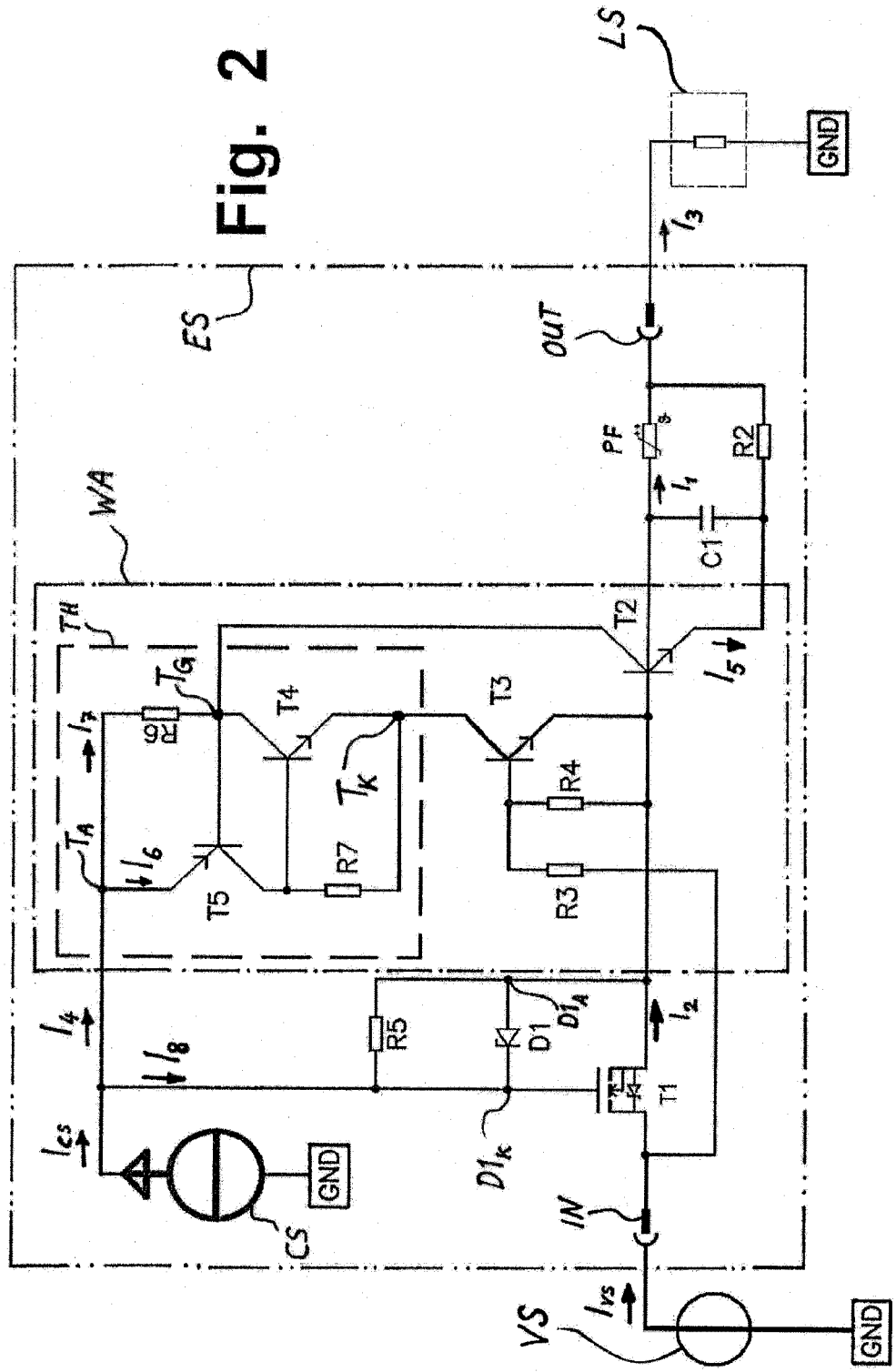
FIG. 2 shows a circuit diagram comprising the circuit diagram of FIG. 1, whereby in addition to the content of FIG. 1, on the one hand, a connection of input terminal IN to a voltage source VS is shown, and, on the other, a connection of output terminal OUT to an electrical load LS is shown.
Figure 3:
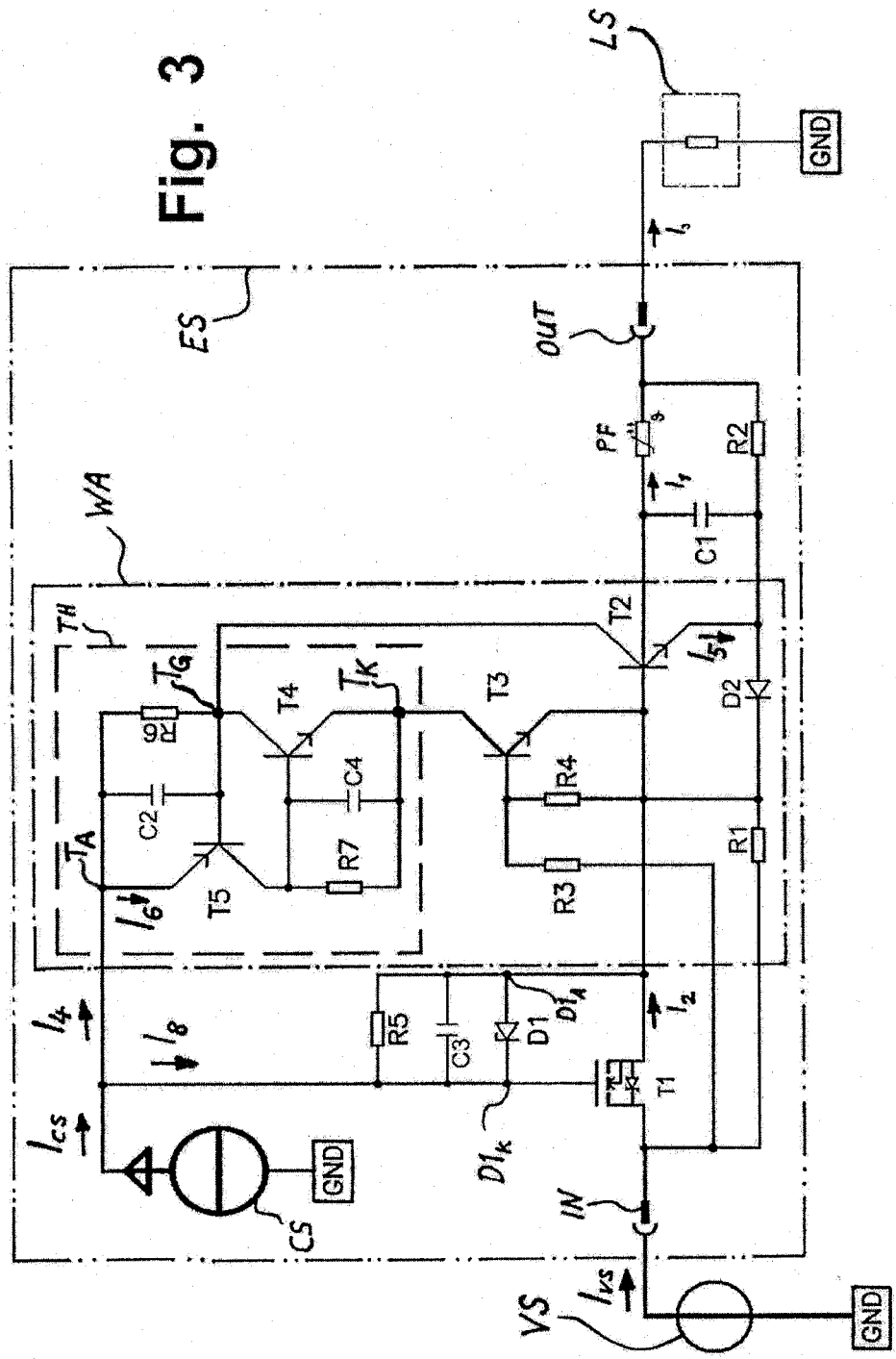
FIG. 3 shows a circuit diagram in which an embodiment of electronic protection device ES is shown, modified in comparison with FIGS. 1 and 2.
Figure 4:
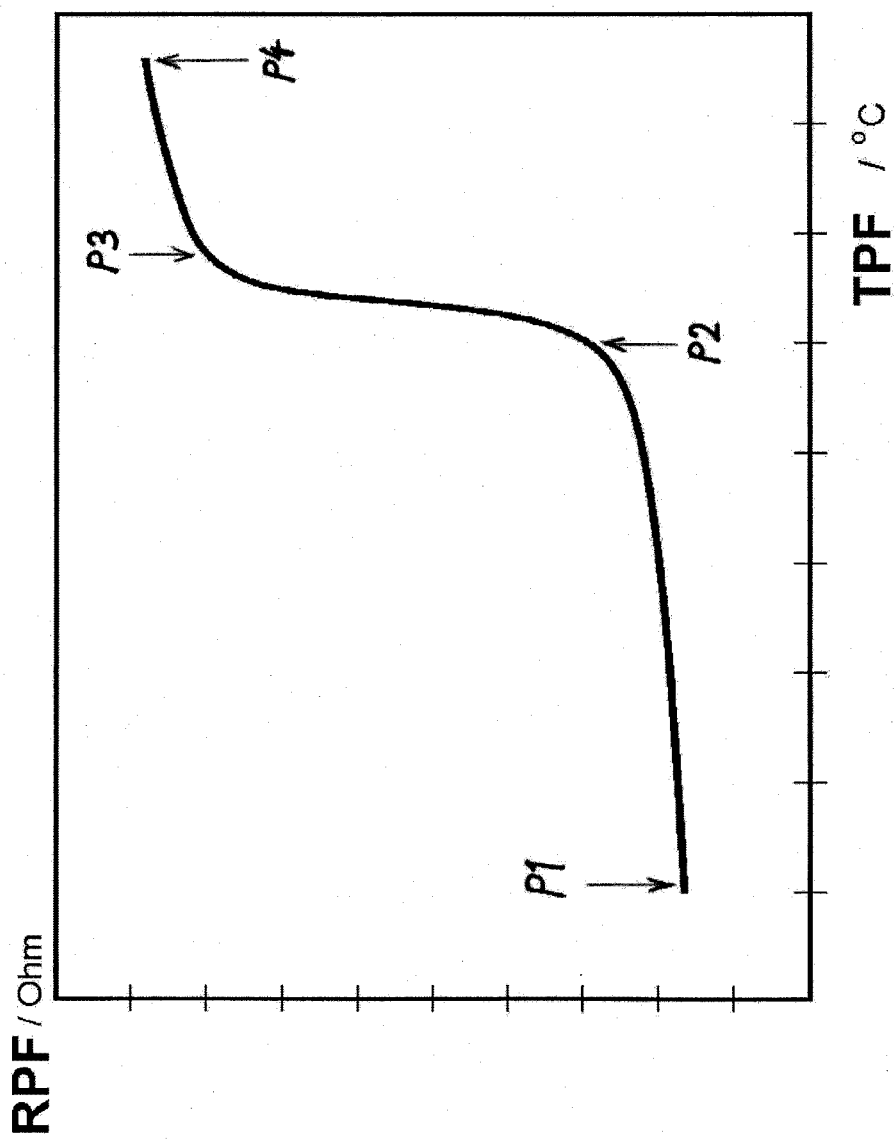
FIG. 4 shows a schematic view of an exemplary temperature-resistance characteristic curve of a fuse element PF, shown in a coordinate system in which, on the one hand, the abscissa shows a temperature increasing toward the right and, on the other, the ordinate an electrical resistance increasing upward.

However, in the embodiments according to FIGS. 1, 2, and 3, it is not provided that first current $I_1$ in the case of an overload connected unchanged at output OUT again increases in such a way that fuse element PF again enters the blocking, therefore the high-resistance state, which is unnecessary in this situation, because blocked transistor T1 holds the protection function as long as the overload at output OUT is not eliminated. Consequently, no continuous thermal load of fuse element PF results due to the connected overload. In other words, fuse element PF is kept in a low-resistance characteristic curve range, which is shown in FIG. 4 between the characteristic curve points P1 and P2, by means of monitoring device WA and by means of transistor T1, which interrupts second current $I_2$ in the case of an overload.

After transistor T1 was set to a blocked state due to the overload, first transistor T1 remains in the blocked state until the overload is either separated from output OUT or the overload in some other way loses the effect as an overload, for example, by a change in resistance within load LS. The disappearance of the overload, or alternatively the decline of first current to or below the reset current value $I_1$ min, results in that the electronic protection circuit again enters its original state, in which first transistor T1 and fuse element PF are "low-resistance."

In an embodiment of the protection device of the invention, it is provided that input terminal IN is arranged at a first end of the series connection of first transistor T1 and fuse element PF, whereby input terminal IN is connected to a voltage source VS, and output terminal OUT is arranged at the second end of the series connection of first transistor T1 and fuse element PF, whereby output terminal OUT is connected to a load LS, whereby electronic protection device ES is provided and set up to block first transistor T1 by means of monitoring circuit WA, influencing first transistor T1, when a predefined maximum allowable value of a load current $I_3$ is exceeded, which flows through load LS, within a time interval, which is influenced by a delay component C1, R2, in order to reduce the value of load current $I_3$ in a way so that load current $I_3$ declines to or below a predefined maximum allowable value.

Tests by the applicant have shown as an advantage of the aforementioned preferred embodiment of the invention that a protection device is provided by this embodiment in simple and cost-effective manner; the tripping delay of said device relative to the switching behavior in the case of an arising too high first current can be conveniently influenced according to the wishes of the circuit developer or the user. A "too high current" within the scope of the present teaching means a current with a value that exceeds a predefined maximum allowable value. The aforementioned ability to influence the tripping delay relative to the switching behavior is particularly provided by a possible change in a delay component, which comprises especially preferably a first capacitor and a second resistor. In this regard, depending on the desired tripping delay, for example, the second resistor or the first capacitor or both components can be changed.

In another embodiment of electronic protection device ES of the invention, it is provided that first transistor T1 is a MOSFET with a source terminal, a gate terminal, and a drain terminal, whereby the gate terminal is connected to a current source CS and monitoring circuit WA, whereby the gate-source voltage of the MOSFET can be influenced by means of monitoring circuit WA. In the refinement of the invention, current source CS supplies a current Ics, designated as the CS current in the text below, which has, for example, a nominal current value of 100 µA.

Because current source CS is connected to the gate terminal of first transistor T1 and to monitoring circuit WA, the current Ics divides into two partial currents, namely, fourth current $I_4$ and eighth current $I_8$.

The fourth current is fed into monitoring circuit WA.

The eighth current I8 influences the gate-source voltage of first transistor T1. If, for example, as a result of an increase in first current $I_1$, partial current $I_4$ increases subsequently, in the case of a substantially constant CS current Ics eighth current I8 will therefore decrease and thereby influence the gate voltage of first transistor T1 and thereby second current $I_2$ through first transistor T1.

As soon as eighth current I8 falls below a predefined value, the gate voltage at first transistor T1 drops below the so-called threshold voltage, as a result of which first transistor T1 enters the blocking state, whereby the blocking state means that second current $I_2$ flowing from source to drain of first transistor T1, apart from negligible small leakage currents, is interrupted.

If, in contrast, the eighth current I8 rises above a predefined value, the gate voltage at first transistor T1 rises above the threshold voltage, as a result of which first transistor T1 enters the conducting state, whereby "conducting state of transistor T1" in reference to FIGS. 1 to 3 means a conducting state between the source and drain of the MOSFET.

It should be noted, therefore, that by division of the CS current Ics of current source CS into the eighth current I8, on the one hand, and the fourth current $I_4$, on the other, according to the equation $Ics=I_8+I_4$ the control voltage of first transistor T1 is influenced, whereby this control voltage in the embodiments of FIGS. 1 to 3 is formed as a gate-source voltage of the MOSFET. The limiting component, which comprises the monitoring circuit and the first transistor, whereby the monitoring circuit and first transistor T1 are connected to the current source CS in the manner described above, limits, as already set forth, the first current flowing through fuse element PF, when an overload occurs at output OUT.

For a better understanding of the invention, in this paragraph the self-resetting thermal fuse element PF known from the state of the art will be dealt with briefly. The operating principle of fuse element PF becomes clear from the consideration of an exemplary temperature-resistance characteristic curve in FIG. 4, where in a schematic illustration the transition from a conducting state to a blocking state of fuse element PF is evident. The temperature TPF, rising toward the right, of fuse element PF is plotted on the abscissa. The ohmic resistance RPF of fuse element PF is plotted on the ordinate.

A relatively slight increase in the resistance RPF with increasing temperature TPF is evident in a first characteristic curve range of FIG. 4, which begins with a start of the characteristic curve P1 and ends in a second characteristic curve point P2. This first characteristic curve range characterizes the conducting state of fuse element PF.

In a second characteristic curve range of FIG. 4, which begins at a second characteristic curve point P2 and ends in the direction of an increasing temperature TPF at a third characteristic curve point P3, an abrupt increase of the resistance RPF is associated with a relatively slight increase in the temperature TPF; this characteristic curve range shows the transition from the conducting state to the blocking state of fuse element PF.

In a third characteristic curve range of FIG. 4, which begins with a third characteristic curve point P3 and continues from there in the direction of the increasing temperature TPF, the blocking state of fuse element PF is present continuously up to the right end of the characteristic curve. A slight increase in the characteristic curve versus the temperature is to be noted simultaneously in the third characteristic curve range.

The specific quantitative characteristic data, valid for a fuse element PF, can be obtained from the data sheets of the manufacturer of the fuse elements. For example, some details of the characteristic data of different fuse elements are listed in the aforementioned document PD1.

In another embodiment of electronic protection device ES, an overvoltage protection circuit device for protecting first transistor T1 is provided parallel to a gate-source junction of first transistor T1.

In an embodiment of the electronic protection device ES, the gate terminal of the MOSFET and the source terminal of the MOSFET are connected to a parallel circuit comprising a fifth resistor R5 and a Zener diode D1, whereby the cathode terminal $D1_K$ of the Zener diode D1 is connected to the gate terminal of the MOSFET, and the anode terminal $D1_A$ of the Zener diode D1 is connected to the source terminal of the MOSFET transistor.

FIGS. 1, 2, and 3 show exemplary embodiments of electronic protection device ES having a monitoring circuit WA, which comprises a thyristor circuit TH with a thyristor anode terminal $T_A$, a thyristor gate terminal $T_G$, and a thyristor cathode terminal $T_K$, whereby to influence a gate-source voltage of the MOSFET, the thyristor anode terminal $T_A$ is connected to the gate of the MOSFET, and the first current $I_1$ can be influenced by means of the gate-source voltage of the MOSFET, whereby preferably the potential at the gate of the MOSFET can be reduced by means of thyristor TH.

Thyristor TH in the exemplary embodiments of FIGS. 1, 2, and 3 is shown as a discretely built circuit, which comprises a PNP transistor T5 and an NPN transistor T4, whereby in FIGS. 1, 2, and 3, thyristor TH is framed by a broken line, which is labeled with the reference character TH.

In the exemplary embodiments of FIGS. 1, 2, and 3, first transistor T1 is a so-called enhancement type MOSFET (enhancement transistor), which at a gate-source voltage of zero volts or at a gate-source voltage below the so-called threshold voltage is substantially in the blocked state, provided a possible current flow due to a so-called body diode, optionally operated in the forward direction, or so-called leakage currents in the MOSFET are disregarded.

The fourth current $I_4$, which is labeled in FIGS. 1, 2, and 3 and is divided into two partial currents at the thyristor anode terminal. TA of thyristor TH, whereby these two partial currents are the sixth current $I_6$ and the seventh current $I_7$, enters into the following equation: Ics=$I_4$+$I_8$.

Consequently, eighth current I8 is reduced in the case of a substantially constant CS current, if fourth current $I_4$ is increased.

The increase in the fourth current $I_4$ is brought about automatically by monitoring circuit WA, if first current $I_1$ reaches or exceeds a predefined maximum value. The reaching or exceeding of the predefined maximum value of first current can occur, for example, when load LS has a (too low) ohmic resistance value, which is below a predetermined limit, particularly when load LS is a short circuit of output terminal OUT to reference potential GND. Subsequently, by reduction of eighth current I8 below a predefined limit value, the potential at the control electrode of first transistor T1, in the present exemplary embodiment therefore the potential at the gate terminal of the MOSFET, is reduced. As soon as this potential falls below the threshold voltage, the MOSFET is blocked and thereby second current $I_2$ is interrupted, whereby first current $I_1$ is also considerably reduced, in fact, such that the temperature TPF of fuse element PF declines.

In an exemplary embodiment, it is provided that the thyristor cathode terminal $T_K$ is connected to a collector terminal of a third transistor T3, whereby third transistor T3 is an NPN bipolar transistor, and whereby a base terminal of third transistor T3 is connected to a first terminal of a third resistor R3, and whereby a second terminal of third resistor R3 is connected to the drain terminal of the MOSFET, and whereby the base terminal of third transistor T3 is connected to a second terminal of a fourth resistor R4 and a first terminal of fourth resistor R4 is connected to the source terminal of the MOSFET and to the emitter terminal of third transistor T3.

In another exemplary embodiment of electronic protection device ES, the thyristor gate terminal $T_G$ is connected to a collector terminal of a second transistor T2. In addition, in the exemplary embodiment, a base terminal of second transistor T2 is connected to the emitter of third transistor T3 and the source terminal of the MOSFET.

According to another embodiment of electronic protection device ES, an emitter terminal of second transistor T2 is connected to a first terminal of a first capacitor C1 and to a first terminal of a second resistor R2 of delay component C1, R2, whereby a second terminal of first capacitor C1 is connected to a first terminal of fuse element PF and to the base terminal of second transistor T2, and whereby a second terminal of fuse element PF is connected to a second terminal of second resistor R2, and a connection point of the second terminal of fuse element PF with the second terminal of second resistor R2 is connected to output terminal OUT of electronic protection device ES.

In another exemplary embodiment of electronic protection device ES, thyristor TH has a fourth transistor T4 with an NPN junction and a fifth transistor T5 with a PNP junction, whereby the thyristor gate terminal $T_G$ is formed by a connection between a base of fifth transistor T5 and a collector of fourth transistor T4, and the thyristor gate terminal $T_G$ is connected to the collector terminal of second transistor T2.

In the last-mentioned exemplary embodiment, the thyristor anode terminal $T_A$ can be configured as a connection of an emitter of fifth transistor T5 to a second terminal of a sixth resistor R6, whereby the first terminal of sixth resistor R6 is connected to a base of fifth transistor T5 and to a collector of fourth transistor T4.

In this regard, in the last-mentioned exemplary embodiment, especially preferably the thyristor cathode terminal $T_K$ can be configured as a connection of an emitter of fourth transistor T4 to a first terminal of a seventh resistor R7, whereby the second terminal of seventh resistor R7 is connected to the base of fourth transistor T4 and to the collector of fifth transistor T5.

In another embodiment of electronic protection device ES of the invention, a first terminal of load LS can be connected to output terminal OUT and a second terminal of load LS is connected to a reference potential GND, whereby the reference potential of the current source CS and/or the reference potential of the voltage source VS are a common reference potential GND and/or the second terminal of load LS is connected to the common reference potential GND.

A use of electronic protection device ES according to the invention provides that electronic protection device ES is used as part of a testing or simulation device for testing at least one control device or a regulating device or for the simulation of an electrotechnical environment system connected to the control device or to the regulating device.

Preferably, electronic protection device ES is used to protect a supply voltage terminal of a simulation device and/or a peripheral circuit electrically connected thereto, which functions as load LS.

The method of the invention for operating the above-described electronic protection device ES comprises the following process steps: the input terminal IN of electronic protection circuit ES is or will be connected to a voltage source VS; the current source CS is or will be connected to a control electrode of first transistor T1, whereby the control electrode is preferably configured as a gate of a MOSFET, and subsequently the output terminal OUT of the electronic protection circuit is or will be connected to a load LS; the first current $I_1$ due to the self-resetting thermal fuse element PF exceeds a predefined maximum current value $I_{wh}$, and subsequently the monitoring circuit WA brings about that first transistor $T_1$ goes from a conducting state to a blocking state, and subsequently the electrical resistor of load LS is increased so much or the load is separated from the output terminal OUT, so that the first current $I_1$ reaches or falls below a predefined reset current value Imin, and subsequently the monitoring circuit WA brings about that the first transistor T1 goes from a blocking state to a conducting state.

The advantage of the invention becomes especially transparent based on the comparison of FIG. 5 with FIG. 6.

The current-time curve of FIG. 5 is in fact shown schematically and simplified; some disadvantages of the known protection circuit from state of the art with the self-resetting thermal fuse element as the only measure for preventing an overload and short circuit of an associated current circuit are clearer in FIG. 5, however. In particular, the comparison of FIG. 5 with the following FIG. 6, whereby FIG. 6 relates to an exemplary embodiment of the invention, shows advantages of the invention and embodiments thereof in an especially transparent manner.

With the aid of FIG. 5, for the purposes of comparison, first an exemplary current-time curve of a long-known circuit arrangement is presented, in which only a self-resetting thermal fuse element acts as a protection component, which is called a fuse element in short. The circuit diagram in the aforementioned document PD1 on page 3, right column, shows an example of a corresponding circuit arrangement. The fuse element current-time course illustrated in FIG. 5 shows between time points t0 and t1 a situation in which an allowable current value Iwh flows through the fuse element and through the "normal" load connected in series therewith. An abrupt increase in the current through the fuse element, called the fuse element current in the text below, is shown starting at time t1. This abrupt increase up to the value Iwh is attributed to an overload, which is connected in series to the fuse element between time t1 and time t4. The fuse element at time t2 has reached a temperature at which the fuse element resistance increases considerably and the protective action begins, which consequently in the example of FIG. 5 has the result that the fuse element current returns to the value Iwn starting at time t3. Starting at time t4, the overload is removed from the circuit arrangement and replaced by a "normal" load, which was already connected in series to the fuse element in the time interval between t0 and t1. After cooling of the fuse element, which occurs between times t4 to t6, the fuse element current again reaches the value Iwm starting at time t6. The following are especially disadvantageous in the described curve according to FIG. 5: a relatively long time period t1 to t3, which is required to reduce the fuse element current to the value Iwn when an overload occurs; the relatively high value Iwn of the fuse element current after the protection takes effect in the time interval from t3 to t4, which is associated with an accelerated aging of the fuse element; and the relatively long period of "recovery" of the circuit arrangement between times t4 to t6 of the fuse element, after at time t4 the overload has been removed from the circuit arrangement and replaced by a "normal" load.

The disadvantages of the state of the art as indicated in FIG. 5 are eliminated or lessened at least in part by means of the invention, as outlined in FIG. 6. The load and overload, which are taken as a basis for the examples of FIGS. 5 and 6, are substantially identical for the purpose of better comparability.

A fuse element current-time curve is also shown in FIG. 6. Between time t0 and time t1, in FIG. 6 the situation exists in which first a "normal" load LS, therefore no overload at first, is connected at output OUT of electronic protection device ES. The "normal" load LS at time t1 is replaced by an overload and the overload remains connected to output OUT until time t4. By means of the invention the fuse element current declines within the relatively short time interval from t1 to t2* to a relatively small value Iwn* of the fuse element current. This relatively small value Iwn* is attributed in particular to the action of monitoring circuit WA and of first transistor T1, whereby transistor T1 is in the blocking state between times t2* and t4.

After starting at time t4 the overload is replaced by the "normal" load, the fuse element current again reaches the value Iwm within a relatively short time interval, which lasts from t4 to t5*. One of the causes of the relatively short "recovery time" from t4 to t5* is that fuse element PF was protected from an overcurrent by first transistor T1, blocked during the time interval from t2* to t4, during the last-named time interval, and consequently the fuse element experienced relatively little heating due to the overload. Thus, after the replacement of the overload by the "normal" load at time t4 a relatively quick return of electronic protection device ES to the original state present at time t0 was already achieved at time t5*. In the end, a more rapid providing of the desired load current $I_3$ for load LS after elimination of the overload is achieved advantageously therewith.

The reference characters for FIGS. 1 to 3, optionally with the parameters of the corresponding electronic components, according to one or more embodiments of the invention are presented below in the form of a table:

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An electronic protection device for protecting at least one electrical load that is connectable to the protection device, the electronic protection device comprising:
   an input terminal;
   an output terminal;
   a fuse element that is thermally self-resetting, the fuse element being configured to conduct or limit a first current as a function of a fuse element temperature; and
   a limiting component to limit the first current, the limiting component comprising a first transistor and a monitoring circuit, the first transistor being connected in series to the fuse element through the monitoring circuit located between the fuse element and the first transistor, the monitoring circuit influencing the first transistor, wherein the monitoring circuit is configured to block the first transistor when the first current reaches or exceeds a predefined maximum current value and is configured to unblock the first transistor when the first current reaches or falls below a predefined unblocking current value.

2. The electronic protection device according to claim 1, wherein the input terminal is arranged at a first end of the series connection of the first transistor and of the fuse element, wherein the input terminal is connected to a voltage source, and the output terminal is arranged at the second end of the series connection of the first transistor and the fuse element, wherein the output terminal is connected to a load, wherein the electronic protection device is configured to block the first transistor via the monitoring circuit by influencing the first transistor when a predefined maximum allowable value of a load current is exceeded, which flows through the load, within a time interval, which is influenced by a delay component, in order to reduce the value of the load current so that the load current declines to or falls below a predefined maximum allowable value.

3. The electronic protection device according to claim 1, wherein the first transistor is a MOSFET with a source terminal, a gate terminal, and a drain terminal, wherein the gate terminal is connected to a current source and the monitoring circuit, wherein the gate-source voltage of the MOSFET is influenced via the monitoring circuit.

4. The electronic protection device according to claim 3, wherein an overvoltage protection circuit device for protecting the first transistor is provided parallel to a gate-source junction of the first transistor.

5. The electronic protection device according to claim 4, wherein the gate terminal of the MOSFET and the source terminal of the MOSFET are connected to a parallel circuit comprising a fifth resistor and a Zener diode, wherein the cathode terminal of the Zener diode is connected to the gate terminal of the MOSFET, and the anode terminal of the Zener diode is connected to the source terminal of the MOSFET transistor.

6. The electronic protection device according to claim 3, wherein the monitoring circuit has a thyristor circuit with a thyristor anode terminal, a thyristor gate terminal, and a thyristor cathode terminal, wherein, to influence a gate-source voltage of the MOSFET, the thyristor anode terminal is connected to the gate of the MOSFET and the first current is influenced via the gate-source voltage of the MOSFET.

7. The electronic protection device according to claim 6, wherein the thyristor cathode terminal is connected to a collector terminal of a third transistor, wherein the third transistor is an NPN bipolar transistor, and wherein a base terminal of the third transistor is connected to a first terminal of a third resistor, and wherein a second terminal of the third resistor is connected to the drain terminal of the MOSFET, and wherein the base terminal of the third transistor is connected to a second terminal of a fourth resistor and a first terminal of the fourth resistor is connected to the source terminal of the MOSFET and to the emitter terminal of the third transistor.

8. The electronic protection device according to claim 6, wherein the thyristor gate terminal is connected to a collector terminal of a second transistor, wherein a base terminal of the second transistor is connected to the emitter of the third transistor and the source terminal of the MOSFET.

9. The electronic protection device according to claim 8, wherein an emitter terminal of the second transistor is connected to a first terminal of a first capacitor and to a first terminal of a second resistor of the delay component, wherein a second terminal of the first capacitor is connected to a first terminal of the fuse element and to the base terminal of the second transistor, and wherein a second terminal of the fuse element is connected to a second terminal of the second resistor, and a connection point of the second terminal of the fuse element with the second terminal of the second resistor is connected to the output terminal of the electronic protection device.

10. The electronic protection device according to claim 6, wherein the thyristor has a fourth transistor with an NPN junction and a fifth transistor with a PNP junction, wherein the thyristor gate terminal is formed by a connection between a base of the fifth transistor and a collector of the fourth transistor, and wherein the thyristor gate terminal is connected to the collector terminal of the second transistor.

11. The electronic protection device according to claim 10, wherein the thyristor anode terminal is configured as a connection of an emitter of the fifth transistor to a second terminal of a sixth resistor, wherein the first terminal of the sixth resistor is connected to a base of the fifth transistor and to a collector of the fourth transistor.

12. The electronic protection device according to claim 10, wherein the thyristor cathode terminal is configured as a connection of an emitter of the fourth transistor to a first terminal of a seventh resistor, wherein the second terminal of the seventh resistor is connected to the base of the fourth transistor and to the collector of the fifth transistor.

13. The electronic protection device according to claim 3, wherein the load has a first terminal connected to the output terminal and the load has a second terminal connected to a reference potential, wherein the reference potential of the current source and/or the reference potential of the voltage source are a common reference potential and/or the second terminal of the load is connected to the common reference potential.

14. Use of the electronic protection device according to claim 1 as part of a testing or a simulation device for testing at least one control device or a regulating device or for the simulation of an electrotechnical environment system connected to the control device or to the regulating device.

15. A method for operating an electronic protection device according to claim 1, the method comprising:
 connecting the input terminal of the electronic protection circuit to a voltage source;
 connecting a current source to a control electrode of the first transistor, the control electrode being configured as a gate of a MOSFET;
 connecting the output terminal of the electronic protection circuit to a load,
 the first current, due to the self-resetting thermal fuse element, exceeds a predefined maximum current value;
 switching, via the monitoring circuit, the first transistor from a conducting state to a blocking state;
 increasing the electrical resistance of the load or separating the load from the output terminal so that the first current reaches or falls below a predefined reset current value; and
 switching, via the monitoring circuit, the first transistor from a blocking state to a conducting state.

16. An electronic protection device for protecting at least one electrical load that is connectable to the protection device, the electronic protection device comprising:
 an input terminal;
 an output terminal;

a fuse element that is thermally self-resetting, the fuse element being configured to conduct or limit a first current as a function of a fuse element temperature; and a limiting component to limit the first current, the limiting component comprising a first transistor that is connected in series to the fuse element and comprising a monitoring circuit that influences the first transistor, wherein the monitoring circuit is configured to block the first transistor when the first current reaches or exceeds a predefined maximum current value and is configured to unblock the first transistor when the first current reaches or falls below a predefined unblocking current value, and wherein the input terminal is arranged at a first end of the series connection of the first transistor and of the fuse element, wherein the input terminal is connected to a voltage source, and the output terminal is arranged at the second end of the series connection of the first transistor and the fuse element, wherein the output terminal is connected to a load, wherein the electronic protection device is configured to block the first transistor via the monitoring circuit by influencing the first transistor when a predefined maximum allowable value of a load current is exceeded, which flows through the load, within a time interval, which is influenced by a delay component, in order to reduce the value of the load current so that the load current declines to or falls below a predefined maximum allowable value.

17. A method for operating an electronic protection device for protecting at least one electrical load that is connectable to the protection device, the electronic protection device comprising an input terminal, an output terminal, a fuse element that is thermally self-resetting, the fuse element being configured to conduct or limit a first current as a function of a fuse element temperature, and a limiting component to limit the first current, the limiting component comprising a first transistor that is connected in series to the fuse element and comprising a monitoring circuit that influences the first transistor, wherein the monitoring circuit is configured to block the first transistor when the first current reaches or exceeds a predefined maximum current value and is configured to unblock the first transistor when the first current reaches or falls below a predefined unblocking current value, the method comprising:

connecting the input terminal of the electronic protection circuit to a voltage source;

connecting a current source to a control electrode of the first transistor, the control electrode being configured as a gate of a MOSFET;

connecting the output terminal of the electronic protection circuit to a load, the first current, due to the self-resetting thermal fuse element, exceeds a predefined maximum current value;

switching, via the monitoring circuit, the first transistor from a conducting state to a blocking state;

increasing the electrical resistance of the load or separating the load from the output terminal so that the first current reaches or falls below a predefined reset current value; and switching, via the monitoring circuit, the first transistor from a blocking state to a conducting state.

* * * * *